United States Patent Office 3,741,977
Patented June 26, 1973

3,741,977
SUBSTITUTED 3-[4-UREIDOPHENYL]-1,3,4-OXADIAZOL-2-ONES
Roger Boesch, Vitry-Sur-Seine, France, assignor to Rhone-Poulenc S.A., Paris, France
No Drawing. Filed Jan. 14, 1971, Ser. No. 106,568
Claims priority, application France, Jan. 16, 1970, 7,001,573
Int. Cl. C07d 85/54
U.S. Cl. 260—307 A          11 Claims

ABSTRACT OF THE DISCLOSURE

The new oxadiazoline derivatives of the formula:

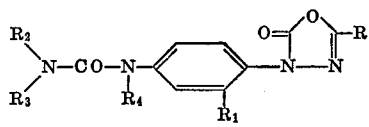

(wherein R represents alkyl or phenyl, or phenyl carrying at least one substituent selected from halogen, alkyl and alkoxy; $R_1$ represents hydrogen, halogen, alkyl, alkoxy, nitro or trifluoromethyl; $R_2$ represents hydrogen, alkyl, alkenyl, alkynyl, alkoxy or alkenyloxy; $R_3$ represents hydrogen or alkyl, and $R_4$ represents hydrogen or alkyl, the alkyl and alkoxy radicals containing 1 to 4 carbon atoms, and the alkenyl, alkynyl and alkenyloxy radicals containing 2 to 4 carbon atoms) are useful as herbicides against monocotyledons and dicotyledons.

This invention relates to new oxadiazoline derivatives, to a process for their preparation and to herbicidal compositions containing them.

The oxadiazoline derivatives of the present invention are those of the general formula:

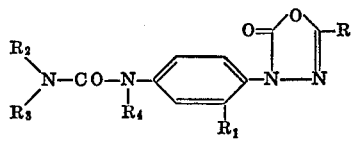  I wherein R represents an alkyl or phenyl radical, or a phenyl radical carrying at least one substituent selected from halogen atoms, and alkyl and alkoxy radicals; $R_1$ represents a hydrogen or halogen atom, or an alkyl, alkoxy, nitro or trifluoromethyl radical; $R_2$ represents a hydrogen atom or an alkyl, alkenyl, alkynyl, alkoxy or alkenyloxy radical; $R_3$ represents a hydrogen atom or an alkyl radical, and $R_4$ represents a hydrogen atom or an alkyl radical. In this specification the alkyl and alkoxy radicals have straight- or branched-chains containing 1 to 4 carbon atoms, and the alkenyl, alkynyl and alkenyloxy radicals contain 2 to 4 carbon atoms.

According to a feature of the invention, the oxadiazoline derivatives of general Formula I are prepared, in accordance with known methods for the preparation of ureas, from amines of the general formula:

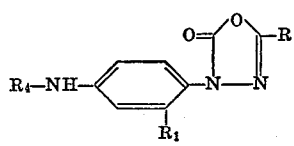  II wherein R, $R_1$ and $R_4$ are as hereinbefore defined.
When in general Formula I $R_4$ represents a hydrogen atom, the oxadiazoline derivatives are obtained by reaction of an amine of the general formula:

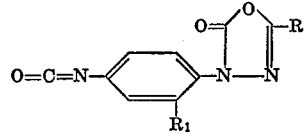  III (wherein $R_2$ and $R_3$ are as hereinbefore defined) with an isocyanate of the general formula:

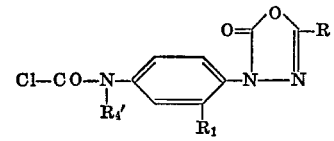  IV wherein R and $R_1$ are as hereinbefore defined. The reaction is generally carried out in an inert organic solvent, for example benzene, at a temperature between 0° and 50° C. It is also possible to add an aqueous solution of the amine of general Formula III to a benzene solution of the isocyanate of general Formula IV, with stirring, and at a temperature between 0° and 50° C.

The isocyanates of Formula IV can be prepared by reaction of phosgene with an amine of general Formula II, wherein $R_4$ represents a hydrogen atom.

When in general Formula I $R_4$ represents an alkyl radical, the oxadiazoline derivatives are obtained by reaction of an amine of general Formula III with a compound of the general formula:

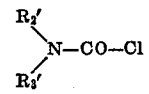  V wherein R and $R_1$ are as hereinbefore defined, and $R_{4'}$ represents an alkyl radical.

When in general Formula I $R_4$ represents a hydrogen atom or an alkyl radical, $R_2$ represents an alkyl, alkenyl, alkynyl, alkoxy or alkenyloxy radical and $R_3$ represents an alkyl radical, the oxadiazoline derivatives are prepared by reaction of a carbamoyl chloride of the general formula:

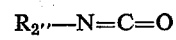  VI wherein $R_{2'}$ represents an alkyl, alkenyl, alkynyl, alkoxy or alkenyloxy radical and $R_{3'}$ represents an alkyl radical, with an amine of general Formula II. The reaction is generally carried out in a basic organic solvent, for example pyridine, at a temperature between 10° and 60° C. It is also possible to carry out the reaction in an organic solvent, for example acetonitrile, methylene chloride or dimethylformamide, in the presence of a basic condensation agent such as pyridine.

When in general Formula I $R_4$ represents a hydrogen atom or an alkyl radical, $R_2$ represents an alkyl, alkenyl or alkynyl radical and $R_3$ represents a hydrogen atom, the oxadiazoline derivatives are prepared by reaction of an isocyanate of the general formula:

$$R_{2''}-N=C=O \qquad \text{VII}$$

wherein $R_{2''}$ represents an alkyl, alkenyl or alkynyl radical, with an amine of general Formula II.

The compounds of general Formulae V and VI can be prepared in accordance with the usual methods for the preparation of carbamoyl chlorides from the corresponding amines.

The amines of general Formula II wherein $R_4$ represents a hydrogen atom can be obtained by reduction of an oxadiazolone derivative of the general formula:

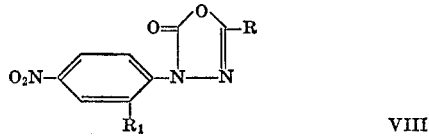

(wherein R and $R_1$ are as hereinbefore defined) either by catalytic hydrogenation or by the action of iron in a dilute acid medium.

The amines of general Formula II wherein $R_4$ represents an alkyl radical can be obtained by alkylation of an amine of general Formula II, wherein $R_4$ represents a hydrogen atom, in accordance with known methods for the alkylation of primary amines.

The oxadiazolones of general Formula VIII can be prepared by the reaction of phosgene with a hydrazide of the general formula:

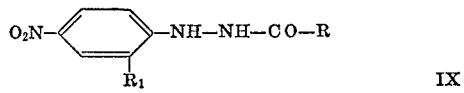

wherein R and $R_1$ are as hereinbefore defined, in an inert organic solvent (e.g. an aromatic hydrocarbon, such as benzene or toluene, or an ether such as diethyl ether, or dioxan) or water at a temperature between 20° and 120° C. (see, for example, British Pat. No. 1,063,799 granted to Rhone-Poulenc S.A. on an application filed Dec. 11, 1964).

The oxadiazoline derivatives of general Formula I so obtained can optionally be purified by physical methods such as crystallisation or chromatography.

The new oxadiazoline derivatives of general Formula I possess remarkable herbicidal properties. The herbicidal activity is shown against monocotyledons and dicotyledons on pre-emergence and post-emergence application. They are active against monocotyledons such as Agrostis spp., rye grass, couch grass and graminaceous plants in general; wheat and maize are resistant to them. Dicotyledons affected by them are, for example Amaranthus spp., Chenopodium spp., Matricaria spp., Polygonum spp., black nightshade and thistle. Furthermore, the oxadiazolines of general Formula I possess a selective activity and can, for example, be used to destroy foxtail in wheat. The presently preferred class of oxadiazolines are those of general Formula I wherein R represents an alkyl or phenyl radical, $R_1$ represents a hydrogen or halogen atom or a trifluoromethyl radical, $R_2$ represents an alkyl, alkynyl, alkoxy or alkenyloxy radical, $R_3$ represents an alkyl radical and $R_4$ represents a hydrogen atom or an alkyl radical, and more particularly those compounds wherein R represents an alkyl radical of 2 to 4 carbon atoms (preferably t-butyl), $R_1$ represents a halogen atom or a trifluoromethyl radical, $R_2$ and $R_3$ are as just defined above, and $R_4$ represents a hydrogen atom. Of outstanding importance are 3-[2-chloro-4-(3,3-dimethylureido)phenyl]-5-t-butyl-1,3,4-oxadiazol-2-one,
3-[2-chloro-4-(3-methyl-3-methoxyureido)phenyl]-5-t-butyl-1,3,4-oxadiazol-2-one,
3-[2-bromo-4-(3,3-dimethylureido)phenyl]-5-t-butyl-1,3,4-oxadiazol-2-one,
3-[2-trifluoromethyl-4-(3-methyl-3-methoxyureido)-phenyl]-5-t-butyl-1,3,4-oxadiazol-2-one,
3-[2-trifluoromethyl-4-(3,3-dimethylureido)phenyl]-5-t-butyl-1,3,4-oxadiazol-2-one,
3-[2-bromo-4-(3-methyl-3-methoxyureido)phenyl]-5-t-butyl-1,3,4-oxadiazol-2-one and
3-[2-bromo-4-(3-methyl-3,1'-methylprop-2'-ynyl-ureido)-phenyl]-5-t-butyl-1,3,4-oxadiazol-2-one.

According to a further feature of the present invention, there are provided herbicidal compositions containing, as the active ingredient, at least one oxadiazoline of general Formula I in association with one or more diluents compatible with the oxadiazoline(s) and suitable for use in agricultural herbicidal compositions. These compositions can optionally contain other compatible pesticides, such as herbicides, insecticides or fungicides. Preferably the compositions contain between 0.05% and 80% by weight of oxadiazoline compound.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the oxadiazoline compound with the solid diluent, or by impregnating the solid diluent with a solution of the oxadiazoline compound in a volatile solvent, evaporating the solvent, and if necessary grinding the product so as to obtain a powder.

Instead of a solid diluent, there may be used a liquid in which the oxadiazoline compound is dissolved or dispersed. The compositions may thus take the form of suspensions, emulsions or solutions in organic or aqueous-organic media, for example aromatic hydrocarbons such as toluene or xylene, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the oxadiazolines may be used in the form of self-emulsifying concentrates containing the active substance dissolved in the emulsifying agent or in a solvent containing an emulsifying agent compatible with the oxadiazoline and solvent, a simple addition of water to such concentrates producing compositions ready for use.

The oxadiazoline derivatives of general Formula I may be applied in doses of between 0.5 and 3 kg. per hectare according to the desired effect and the weed species to be treated.

The following examples illustrate the preparation of the oxadiazoline derivatives of the present invention.

EXAMPLE 1

A solution of dimethylamine (2.25 g.) in anhydrous benzene (14 cc.) is added, at 20° C. and over the course of 10 minutes, to a suspension of 3-(2-chloro-4-isocyanato-phenyl)-5-t-butyl-1,3,4-oxadiazol-2-one (14.65 g.) in anhydrous benzene (36 cc.). As the reaction is exothermic, the temperature rises to 35° C. The medium becomes homogeneous and then a precipitate appears. Stirring is continued for 3 hours at 20° C., and the precipitate formed is filtered off and then dried under reduced pressure (0.5 mm. Hg) at 20° C. After recrystallisation from ethanol (175 cc.), 3-[2-chloro-4-(3,,3-dimethylureido)-phenyl]-5-t-butyl-1,3,4-oxadiazol-2-one (13.45 g.), melting at 193° C., is obtained.

3-(2-chloro - 4 - isocyanato-phenyl)-5-t-butyl-1,3,4-oxadiazol-2-one can be prepared as follows:

3-(2 - chloro - 4 - amino-phenyl)-5-t-butyl-1,3,4-oxadiazol-2-one (61.5 g.) is added to a 20% (w./v.) solution (407 cc.) of phosgene in toluene. The mixture is then progressively heated under reflux until the evolution of gas ceases. The solvent is evaporated under reduced pressure (25 mm. Hg) at 60° C., and the residue is then dried to constant weight at 20° C. under reduced pressure (0.5 mm. Hg). 3-(2-chloro-4-isocyanato-phenyl)-5-t-butyl-1,3, 4-oxadiazol-2-one (67.5 g.), melting at 63° C., is thus obtained.

The 3 - (2 - chloro-4-amino-phenyl)-5-t-butyl-1,3,4-oxadiazol-2-one starting material, melting at 163° C., can be obtained by reduction (with iron in a dilute acid medium or by catalytic reduction) of 3-(2-chloro-4-nitro-phenyl)-5-t-butyl-1,3,4-oxadiazol-2-one melting at 102° C.

On following the same procedure, using suitable starting materials, the following products of general Formula I are obtained:

oxadiazol-2-one (12.5 g.), melting at 191° C., is obtained.

EXAMPLE 59

A solution of O-allyl-N-methylhydroxylamine (8.7 g.) in water (200 cc.) is added over the course of about 10 minutes, with stirring, to a solution of 3-(2-chloro-4-isocyanato-phenyl)-5-t-butyl-1,3,4-oxadiazol-2-one (29.4 g.) in benzene (200 cc.) maintained at 20° C. After 30 minutes stirring, the precipitate which has formed is filtered off, washed with benzene (3 × 100 cc.) and then dried at

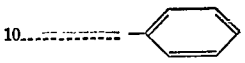

50° C. under reduced pressure (0.5 mm. Hg). 3-[2-chloro-4-(3-methyl - 3 - allyloxyureido)phenyl]-5-t-butyl-1,3,4-oxadiazol-2-one (32 g.), melting at 142° C., is obtained. After recrystallisation from ethanol, the product melts at 143° C.

EXAMPLE 58

Dimethylcarbamoyl chloride (5.65 g.) is added to a solution of 3-(2-chloro-4-amino-phenyl)-5-t-butyl-1,3,4-oxadiazol-2-one (13.35 g.) in anhydrous pyridine (50 cc.). The reaction mixture is then heated at 40° C. for 8 hours. After cooling, the mixture is poured into water (250 cc.) and the precipitate which appears is filtered off, washed with water (3 × 50 cc.) and then taken up in methylene chloride (170 cc.). After decantation of the aqueous layer, hydrochloric acid (d=1.18; 4 cc.) is added to the organic layer, and then, after stirring for about 1 hour, the precipitate of the hydrochloride of the aminophenyloxadiazolone starting material which has formed is filtered off. The methylene chloride filtrate is washed with water (2× 150 cc.) and then dried over anhydrous sodium sulphate. On evaporating the solvent at 50° C. under reduced pressure (25 mm. Hg), 3-[2-chloro - 4 - (3,3-dimethylureido)phenyl]-5-t-butyl-1,3,4-

EXAMPLE 60

A solution of 3-(2-chloro-4-methylaminophenyl)-5-t-butyl-1,3,4-oxadiazol-2-one (10.2 g.) in anhydrous benzene (27 cc.) is added over the course of about 10 minutes to a mixture cooled to about 2° C. of anhydrous benzene (45 cc.), a 28% (w./v.) solution (12.7 cc.) of phosgene in toluene, and triethylamine (3.6 g.). The reaction mixture is stirred for 1 hour at 3° C., and then there is added, at 3° C. and over the course of 30 minutes, a 10.2% (w./v.) solution (35 cc.) of dimethylamine in benzene. Stirring is continued for 3 hours at a temperature between 3° and 5° C., and then water (70 cc.) is added to the reaction mixture. The organic phase is decanted, washed with water (5× 70 cc.) and dried over sodium sulphate. On concentration at 55° C. under reduced pressure (15 mm. Hg), there is obtained a viscous oil which is purified by chromatography through a column of silica. 3 - [2-chloro-4-(1,3,3-trimethylureido)phenyl]-5-t-butyl-1,3,4-oxadiazol-2-one (8.3 g.) is thus isolated in the form of a light yellow viscous mass.

3-(2-chloro-4-methylaminophenyl) - 5 - t-butyl-1,3,4-oxadiazol-2-one, melting at 110° C., can be prepared by acetylation, sodation, methylation and then hydrolysis of 3-(2-chloro-4-aminophenyl) - 5 - t-butyl-1,3,4-oxadiazol-2-one.

The following example illustrates herbicidal compositions according to the present invention.

EXAMPLE 61

A wettable powder containing 50% of active product is prepared in the following manner:

1 part of mono-oleate of a polyoxyethylene derivative of sorbitol, 20 parts of calcium lignosulphite and 29 parts of kieselguhr 23 are added to 50 parts of 3-[2-chloro-4-(3,3-dimethylureido)phenyl]-5-t-butyl - 1,3,4 - oxadiazol-2-one, the parts being by weight.

Following grinding and sieving, the powder obtained is used, after dilution with water, to destroy weeds such as those hereinbefore mentioned specifically.

According to another feature of the invention, a method of controlling the growth of weeds at a locus comprises applying to the locus a herbicidally-effective quantity of an oxadiazoline derivative of general Formula I. The oxadiazoline may be applied to a crop-growing area, the amount of applied oxadiazoline then being sufficient for control of the weed, e.g. foxtail, but insufficient to cause substantial damage to the crop, e.g. wheat. The dosage can vary in accordance with the weed or weeds to be controlled, the crop and the desired effect. In general, dosages of active material of 0.5 to 3 kg. per hectare give good results.

I claim:
1. An oxadiazoline derivative of the general formula:

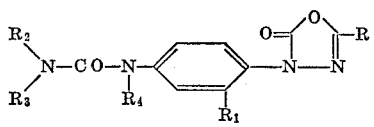

wherein R represents alkyl or phenyl; $R_1$ represents hydrogen, alkyl, or trifluoromethyl; $R_2$ represents hydrogen, alkyl, alkynyl, alkoxy or alkenyloxy; $R_3$ represents hydrogen or alkyl, and $R_4$ represents hydrogen or alkyl, the alkyl and alkoxy radicals containing 1 to 4 carbon atoms, and the alkenyl, alkynyl and alkenyloxy radicals containing 2 to 4 carbon atoms.

2. An oxadiazoline derivative according to claim 1 wherein R represents alkyl or phenyl, $R_1$ represents hydrogen, halogen or trifluoromethyl, $R_2$ represents alkyl, alkynyl, alkoxy or alkenyloxy, $R_3$ represents hydrogen or alkyl and $R_4$ represents hydrogen or alkyl, the alkyl and alkoxy radicals containing 1 to 4 carbon atoms, and the alkynyl and alkenyloxy radicals containing 2 to 4 carbon atoms.

3. An oxadiazoline derivative according to claim 1 wherein R represents alkyl of 2 to 4 carbon atoms, $R_1$ represents halogen or trifluoromethyl, $R_2$ represents alkyl, alkynyl, alkoxy or alkenyloxy, $R_3$ represents alkyl and $R_4$ represents hydrogen, the alkyl and alkoxy radicals within the definition of symbols $R_2$ and $R_3$ containing 1 to 4 carbon atoms, and the alkynyl and alkenyloxy radicals within the definition of $R_2$ containing 2 to 4 carbon atoms.

4. An oxadiazoline derivative according to claim 1 wherein R represents the t-butyl radical.

5. 3-[2-chloro - 4 - (3,3-dimethylureido)phenyl]-5-t-butyl-1,3,4-oxadiazol-2-one.

6. 3-[2-chloro - 4 - (3-methyl-3-methoxyureido)phenyl]-5-t-butyl-1,3,4-oxadiazol-2-one.

7. 3-[2-bromo - 4 - (3,3-dimethylureido)phenyl]-5-t-butyl-1,3,4-oxodiazol-2-one.

8. 3-[2-trifluoromethyl - 4 - (3-methyl-3-methoxyureido)phenyl]-5-t-butyl-1,3,4-oxadiazol-2-one.

9. 3-[2-trifluoromethyl - 4 - (3,3-dimethylureido)phenyl]-5-t-butyl-1,3,4-oxadiazol-2-one.

10. 3-[2-bromo - 4 - (3-methyl-3-methoxyureido)phenyl]-5-t-butyl-1,3,4-oxadiazol-2-one.

11. 3-[2 - bromo - 4 - (3-methyl-3-1'-methylprop-2'-ynyl-ureido)phenyl]-5-t-butyl-1,3,4-oxadiazol-2-one.

References Cited
UNITED STATES PATENTS
3,024,233    3/1962    Sherman _____ 260—247.2

ALEX MAZEL, Primary Examiner
R. V. RUSH, Assistant Examiner

U.S. Cl. X.R.
71—92

UNITED STATES PATENT OFFICE
CERTIFICATE OF CORRECTION

Patent No. 3,741,977    Dated June 26, 1973

Inventor(s) Roger BOESCH

It is certified that error appears in the above-identified patent and that said Letters Patent are hereby corrected as shown below:

Claim 1, line 2 after the formula, after "drogen" and before "alkyl" insert --halogen,--.

Signed and Sealed this

Tenth Day of August 1976

[SEAL]

Attest:

RUTH C. MASON  
Attesting Officer

C. MARSHALL DANN  
Commissioner of Patents and Trademarks